United States Patent [19]

Ficht et al.

[11] Patent Number: 4,712,780
[45] Date of Patent: Dec. 15, 1987

[54] HYDROPNEUMATIC SPRING SUSPENSION DEVICE

[75] Inventors: Reinhold Ficht, Kirchseeon; Walter Vilsmeier, Grossfendorf, both of Fed. Rep. of Germany

[73] Assignee: Ficht GmbH, Fed. Rep. of Germany

[21] Appl. No.: 825,284

[22] PCT Filed: May 31, 1985

[86] PCT No.: PCT/DE85/00190

§ 371 Date: Mar. 14, 1986

§ 102(e) Date: Mar. 14, 1986

[87] PCT Pub. No.: WO85/05605

PCT Pub. Date: Dec. 19, 1985

[30] Foreign Application Priority Data

Jun. 1, 1984 [DE] Fed. Rep. of Germany ....... 3420557

[51] Int. Cl.[4] ............................................. B60G 11/26
[52] U.S. Cl. ........................................ 267/256; 92/38; 92/42; 92/43; 92/44; 92/121; 188/298; 188/306; 267/64.27; 267/122; 280/705
[58] Field of Search ................... 267/15 A, 122, 64.27; 188/306, 298; 92/38, 39, 42, 43, 44, 121; 280/702, 705

[56] References Cited

U.S. PATENT DOCUMENTS

| | | | |
|---|---|---|---|
| 1,936,788 | 11/1933 | Hardy | 188/302 |
| 3,002,741 | 10/1961 | Akutowicz | 267/8 R |
| 3,202,061 | 8/1965 | Johnston | 92/37 |
| 3,977,648 | 8/1976 | Sigmon | 251/59 |
| 4,156,536 | 5/1979 | Brandstadter | 280/705 |

FOREIGN PATENT DOCUMENTS

| | | | |
|---|---|---|---|
| 222175 | 1/1909 | Fed. Rep. of Germany. | |
| 468320 | 11/1928 | Fed. Rep. of Germany. | |
| 811893 | 8/1951 | Fed. Rep. of Germany | 267/64.27 |
| 1122845 | 1/1962 | Fed. Rep. of Germany. | |
| 1655029 | 4/1967 | Fed. Rep. of Germany. | |
| 2227139 | 6/1974 | Fed. Rep. of Germany. | |
| 2311651 | 9/1974 | Fed. Rep. of Germany. | |
| 2317330 | 10/1974 | Fed. Rep. of Germany. | |
| 2322016 | 11/1974 | Fed. Rep. of Germany. | |
| 2456002 | 7/1975 | Fed. Rep. of Germany. | |
| 2819355 | 11/1979 | Fed. Rep. of Germany. | |
| 2953137 | 3/1981 | Fed. Rep. of Germany. | |
| 3241461 | 5/1984 | Fed. Rep. of Germany. | |
| 642711 | 5/1928 | France. | |
| 792738 | 10/1935 | France. | |
| 1240183 | 7/1960 | France. | |
| 2333168 | 6/1977 | France. | |
| 606774 | 11/1978 | Switzerland | 92/121 |
| 865223 | 4/1961 | United Kingdom | 92/121 |
| 1193264 | 5/1970 | United Kingdom. | |

Primary Examiner—George E. A. Halvosa
Attorney, Agent, or Firm—Armstrong, Nikaido, Marmelstein & Kubovcik

[57] ABSTRACT

The invention relates to a hydropneumatic spring suspension or shock absorber device, in particular for heavy motor vehicles, which a spring element comprising a housing for a spring bellows filled with a hydraulic medium which is in flow connection with a chamber filled with hydraulic fluid and in which a pneumatic spring is disposed which is deformable under hydraulic pressure, one end of the bellows being supported in the housing and medium being admitted at the other end via an abutment connected with one of the parts. In accordance with the invention, a compact low wear-and-tear spring suspension device is obtained in that the bellows is bent into a substantially circular arc shape and the abutment is movable along the circular arc.

14 Claims, 2 Drawing Figures

HYDROPNEUMATIC SPRING SUSPENSION DEVICE

The invention relates to a hydropneumatic spring suspension or shock-absorbing device for use in suspension systems, such as on heavy duty vehicles.

In a shock-absorbing device of this type known from AS 2 227 139 which incidentally may also be used as an emergency shock-absorbing buffer for elevators, the bellows is of cylindrical shape. Compressed air is admitted the bellows at one end across an abutment and a cylinder secured thereon in which a pneumatic spring is disposed. The pneumatic spring is a metal bellows stressed from the outside across a throttle valve inserted between the chamber for the pneumatic spring inside the cylinder and the spring bellows. The disadvantage here is that installation of the shock absorbing device requires considerable space because the cylinder receiving the pneumatic spring is an extension of the bellows. Since the outer rims of the bellows grind against the housing when deformed, and since the outside of the bellows is reinforced with wire, there is considerable abrasion when the bellows is deformed, thus precluding long-term use of this shock absorbing device. From DE-OS No. 1 655 029, a hydropneumatic shock absorbing device is known for spring suspension between vehicle parts and the chassis, in which a plurality of hydraulic cylinders separated by a diaphragm and throttle points is structurally connected with a gas pressure reservoir. This shock absorbing device is very expensive to build and also requires too much space. Further, its absorption performance makes it only marginally usable in heavy motor vehicles.

The underlying object of the invention is to provide a hydropneumatic spring suspension device of the type indicated which combines an extraordinarily compact construction with low wear and tear and which can be heavily loaded.

In the case of the selected circular arc shape of the spring bellows, the latter in its straight development of the arc has a great operational length which however, due to the circular arc shape, is accommodated in a very narrow space. Nevertheless, the bellows may be extended very vigorously so as to be capable of sustaining heavy loads. Despite the great carrying capacity, the dimensions of the housing are compact, so that the spring suspension device can be used with advantage in a restricted space. The abutment also moving along the circular arc, a wide effective stroke is available without a negative effect on the compactness of the housing measurements. With this construction, wear-and-tear inhibiting provisions may be targeted, so that the spring suspension device may operate continuously even at high loads during a long service life. The compact dimensions of the suspension device are particularly advantageous for suspending chassis parts of heavy vehicles and, in particular, for suspension or shock absorption for supporting rollers of the chains of tracked vehicles, for example of armored cars. In such case, a plurality of support rollers must be supported in particularly cramped conditions, particularly so far as the structural height is concerned.

A particularly compact structure of the spring suspension device is obtained in the device of the instant invention because the individual cooperating components are disposed inside the circle whose arc determines the shape of the bellows. Since no mechanical but merely a flow connection between the bellows and the pneumatic spring is necessary, the spring may with regard to compactness of the suspension device, be practically freely allocated to the bellows.

In practice, in one embodiment which has proved particularly satisfactory, a little more than a semi-circle is occupied by the spring bellows, while the remaining part of the full circle the pneumatic spring.

A compact spring suspension device operating with low wear and tear is realized in one embodiment by eliminating the dynamic seals by structurally combining the bellows with its support and admission elements. Structural units capable of being heavily loaded are thus provided.

The individual segments produce the desired deformability of the bellows in the direction of the circular arc and contribute great stability in the radial direction.

Since the shape of the individual segments is wedge-like in side elevation, effective transmission of motion between the individual segments in the bellows is accomplished which contributes toward increasing wear and tear resistance of the bellows in the suspension device.

The eccentric position of the passage in each segment, shifted in direction toward the center of the circular arc which the bellows follows, has the advantage that flexibility of the bellows is particularly good near its outer periphery.

The beads improve the form stability of the individual segments and lead to the bellows having lower mechanical resistance to deformation. This has the advantage that the characteristic of the suspension device is influenced only to an exactly predeterminable degree by the purely mechanical resistance of the spring bellows to deformation.

The form-locking support of the individual segments during deformation of the bellows increases the carrying capacity of the spring suspension device. The individual segments are very stable against buckling, and this desirable effect increases with increasing deformation and rising internal pressure in the spring bellows.

The bellows, without dynamic sealing elements, is flow-connected with the chamber containing the spring. This reduced wear and tear of the spring suspension device.

The individual elements and the bellows are supported on the slide bar during working movements of the spring suspension device, so that the areas connecting the individual segments are protected against local overload.

The support of the bellows during operation of the spring suspension device is particularly effective independently of the degree of deformation of the pneumatic spring. From the production technique point of view, it is here particularly simple to accommodate the slide bar.

The low wear and tear or achievable long life of the spring suspension device is further enhanced by the support pressure between the bellows and the slide bar distributed over large surface areas which may also be designed so as to inhibit wear and tear or improve sliding ease.

From the point of view of compact construction of the spring suspension device, the type of mounting and design of the pneumatic spring have the additional advantage that no dynamic sealing elements are required.

Given the compact dimensions of the housing and the special shape, the spring suspension device of this invention may be very securely and stably supported without requiring special supports. Based merely on its configuration, the spring suspension device can absorb the stresses exerted on it and transfer the resulting forces into the bearing. It needs merely to be inserted, transversely to the plane of the circular arc, into a suitable holding device and fixedly secured with simple means.

The compact construction of the spring suspension device enables the stresses to be absorbed to be introduced centrally into the housing and transmitted by suitable lever arms to the bellows and the pneumatic spring.

The rocker arm enables transmission of the load to be absorbed by the spring suspension device.

Figure 1:
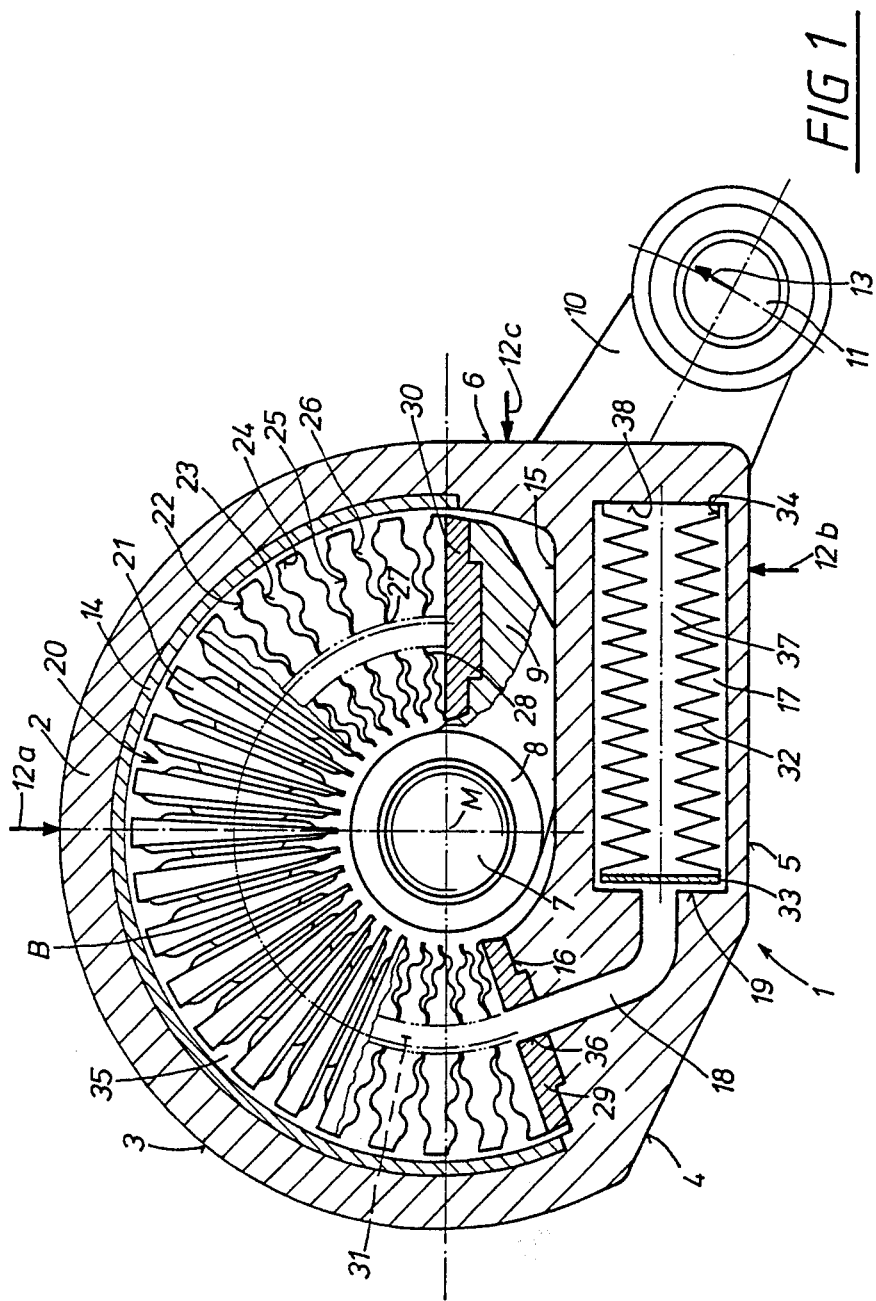
FIG. 1 is a cross-section through a spring suspension device in unloaded spring position.

A hydropneumatic spring suspension device 1, which is particularly suitable, for example, for suspension of the supporting rollers of chains of tracked vehicles, for example armored cars, and as shock absorption devices for elevators, for forging hammers and in rolling mill installations as well as for suspension of the chassis in heavy motor vehicles, comprises a housing 2 closed on all sides, its inside accessible, if desired, through a cover, having an outer surface 3 which is round in relation to a central point M as well as fitting areas 4, 5 and 6 merging into it. A countershaft 7 projects into the housing 2 vertically to the plane of the drawing, an engaging lever 9 being secured in the housing 2 by a hub 8, for example by wedging. On the countershaft 7 projecting out of the housing 2, a swing arm 10 is secured on the outside, its outer end being provided with a lug 11 part of which, not shown, may be articulated.

The housing 2 is supported in direction of the arrows 12a, 12b and 12c. Loads are absorbed in the lug 11 in the direction of an arrow 13 about the center axle M of the countershaft 7 and tend to swing the lever 10 counterclockwise.

In the housing 2, a recess 35 is provided in the form of a circular segment whose outer wall carries a slide 14, for example a coating of U-shaped cross-section, or an inserted strip. The recess 35 is limited on one side by a plane stop face 15 and on the other side by a stop face 16 disposed substantially radially to the center axle M. Further, a substantially cylindrical chamber 17 is provided in the housing 2 which is in fuel-transmitting connection with the recess 35. The chamber 17 is limited at one end by a plane bottom 38 and at the other end by a plane stop face 19 into which the channel 18 opens.

Figure 2:
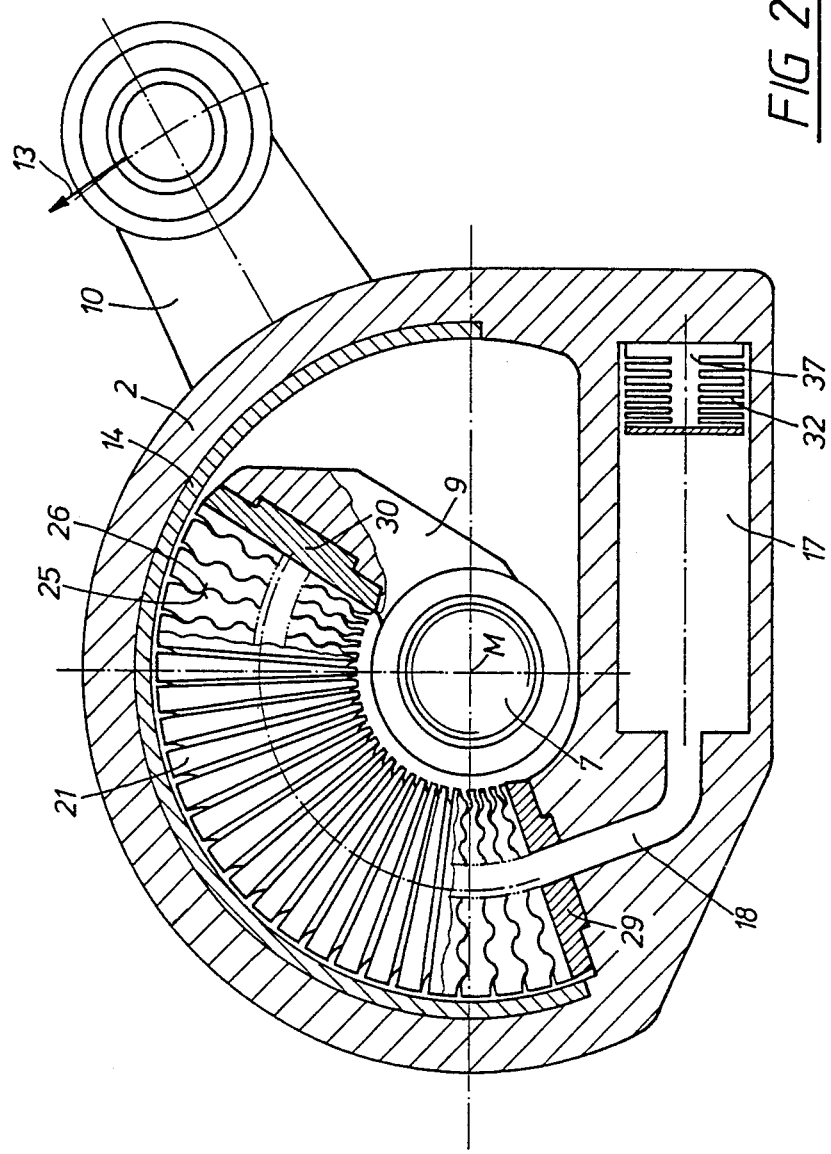
FIG. 2 is a cross-section through the spring suspension device in loaded spring position.

In the recess 35, a spring bellows 20 is disposed bent into a circular arc (B) whose center is the central axle M. The bellows comprises individual hollow substantially disc-shaped segments 21. The segments 21 are made of sheet metal and their upper and lower sides 22 and 23 are provided with beads 25, 26 concentrically surrounding the passage 27. The beads of adjacent upper and under sides 22, 23 of adjoining segments 21 fit form-lockingly into each other. The segments 21 are welded together in areas 28 bordering on the passages 27. In the views according to FIGS. 1 and 2, the individual segments 21 are substantially wedge-shaped, that is, their height increases radially referred to the center axle M. Each segment 21 has a widened edge area 24 for abutting against the slide 14 when the spring bellows—as indicated in FIG. 2—is deformed. The first segment 21 of the bellows 20 is one-half only and is hermetically welded to the bottom 29 resting against the surface 16 and secured thereto, if desired. The last segment 21 is also one-half only and is sealed to the cover 30 mounted on the lever 9 or connected with it. The passages 27 of the segments 21 form a conduit 31 connected with the channel 18 via an aperture 36 in the bottom 29.

The chamber 17 contains a pneumatic spring 32 in the form of a cylindrical siphon bellows whose end 34 is tightly welded to the bottom 38 and whose other end is hermetically closed by a rigid plate 33. The interior 37 of the pneumatic spring 32 is filled with a gas under a specific pressure, so that the plate 33 rests against the surface 19 when the spring suspension device 1 is unloaded in the unsprung position according to FIG. 1. The bellows 20, the channel 18 and the chamber 17 are filled with a hydraulic medium. To fill the spring suspension device (hydraulic and gas filling), valve devices, not shown, are provided or the corresponding components are filled during assembly of the spring device and then hermetically closed. Either oil or a damping paste may be used as the hydraulic medium.

The function principle of the spring suspension device is explained hereinbelow in connection with FIGS. 1 and 2 of the drawings. In the position according to FIG. 1, a static load only, or no load at all, acts in direction of the arrow 13. The pneumatic spring 32 is slack or substantially slack, the lever 9 rests on the surface 15. When a shocklike load starts to act in the boss 11 in direction of the arrow 13, the swing arm 10 deviates counterclockwise and compresses the bellows 20 via the lever 9 and the cover 30. The expelled hydraulic medium flows through the conduit 18 into the chamber 17, the pneumatic spring 32 becoming shorter. As a result, a specific system pressure obtains in the hydraulic medium and in the gas volume of the pneumatic spring according to the law of polytropic condition changes of ideal gases. This system pressure acts between the bottom 29 and the cover 30 as spring tension against the load. When the bellows 20 is deformed, the beads 25, 26 intermesh since the individual segments are compressed. However, as the interior pressure in the bellows 20 increases, the segments 21 are mutually supported by the intermeshing beads against bulging. As soon as the load in the boss 11 decreases or is eliminated, the effective spring tension urges the lever 10 back into the end position, the pneumatic spring 32 and the bellows 20 slackening again. During the deforming movement of the bellows 20, the surface areas 24 may be supported on the slide 14. In order to achieve optimal mobility in the outer area of the bellows 20 where relative movements in direction of the circular arc are strongest during the deformation movement, passages 27 are disposed eccentrically in the individual segments in direction toward the center axle M.

The chamber 17 could be placed nearer the surface 16 and the surface 15, so that the housing could be completely round and introduced into a round receiving member. Instead of the surfaces 4, 5, 6, other formfitting means would then have to be provided in order to prevent torsion of the housing 2 under the load in direction of the arrow 13.

A plurality of bellows 20 with different spring characteristics may be mounted in series in the housing 2 in direction of the center axle M and combined with various types of pneumatic springs, so that the suspension device 1 may yield a predetermined spring effect designed for any specific use.

We claim:

1. Hydropneumatic spring suspension device for a vehicle for insertion between suspension components movable in relation to each other, comprising a housing having a spring bellows therein filled with a hydraulic medium and hydraulically connected by a channel to a chamber filled with said hydraulic medium and containing a pneumatic spring deformable under hydraulic pressure, one end of said bellows being supported in said housing and connected at its other end through an abutment connected to one of said suspension components, said bellows comprising a plurality of individual segments fixed together along the arc of a circle and having an eccentric passage passing therethrough, each of said segments having walls with beads thereon, said walls on adjacent segments being joined to each other around said eccentric passage and forming a liquid tight joint between said segments, said beads on the adjacent walls of said segments nesting into each other when said bellows is compressed and interlocking said walls, said bellows being bent substantially in the shape of an arc of a circle, said abutment connected at said other end of said bellows being movable along a circular arc.

2. Hydropneumatic spring suspension device in accordance with claim 1, characterized in that said spring bellows when not deformed, extends in said housing over a first portion of a full circle, and said chamber is substantially disposed in a second portion of said full circle in alignment with an end of said bellows in said housing.

3. Hydropneumatic spring suspension device in accordance with claims 1 or 2, characterized in said spring bellows extends over a little more than a semicircular arch.

4. Hydropneumatic spring suspension device in accordance with claims 1 or 2, characterized in that said supported one end of said bellows is hermetically sealed to said housing and said other end of said bellows connected through said abutment is movable in the housing along said arc of said circle.

5. Hydropneumatic spring suspension device in accordance with claims 1 or 2, characterized in that said bellows is a metal bellows comprising individual flatly superposed welded segments.

6. Hydropneumatic spring suspension device in accordance with claims 1 or 2, characterized in that each of said individual segment is a hollow circular disk of a height increasing radially outwardly from said circular arc.

7. Hydropneumatic spring suspension device in accordance with claims 1 or 2, characterized in said passage of said segments form a conduit connected to said chamber through an aperture and a connecting channel in said housing.

8. Hydropneumatic spring suspension device in accordance with claims 1 or 2, characterized in that a slide bar for said individual segments of said bellows is disposed in said housing.

9. Hydropneumatic spring suspension device in accordance with claim 8 characterized in that, when said bellows is not deformed, said slide bar extends upwardly from the bottom of said housing concentrically to said circular arc.

10. Hydropneumatic spring suspension device in accordance with claim 9 characterized in that each segment is equipped with a flat rim area for abutment against said slide bar.

11. Hydropneumatic spring suspension device in accordance with claims 1 or 2, characterized in that said pneumatic spring is a cylindrical elongated diaphragm bellows tightly secured at one end of its ends to the bottom of said chamber and facing at its other end said channel sealed by a rigid plate.

12. Hydropneumatic spring suspension device in accordance with claims 1 or 2, characterized in that the part of said housing containing said bellows is round and has at least one fitting surface at the end receiving said pneumatic spring.

13. Hydropneumatic spring suspension device in accordance with claims 1 or 2, characterized in that a center shaft passes through said housing vertically to the plane of said circular arc and is equipped with a lever.

14. Pneumatic spring suspension device in accordance with claim 13 characterized in that a rocker arm is mounted outside the housing on said center shaft.

* * * * *